United States Patent
Hassan et al.

(10) Patent No.: US 12,319,882 B1
(45) Date of Patent: Jun. 3, 2025

(54) ECO-FRIENDLY BIODIESEL PRODUCTION METHOD USING WASTE OLIVE OIL AND PULP-DERIVED CATALYSTS

(71) Applicant: JOUF UNIVERSITY, Sakaka (SA)

(72) Inventors: Hassan Mohamed Ahmed Hassan, Sakaka (SA); Meshal Alzaid, Sakaka (SA); Ibrahim Hotan Alsohaimi, Sakaka (SA); Modather Farouk Hussein, Sakaka (SA); Mohamed Ramadan Abdelmegid Elaassar, Sakaka (SA); Hazim Mohammed Ali, Sakaka (SA); Mohamed Yousri El-Sayed Ibrahim, Sakaka (SA); Tarek Ahmed Seaf Elnasr Ahmed, Sakaka (SA); Azzah Tahal Alenezi, Sakaka (SA)

(73) Assignee: JOUF UNIVERSITY, Sakaka (SA)

( * ) Notice: Subject to any disclaimer, the term of this patent is extended or adjusted under 35 U.S.C. 154(b) by 0 days.

(21) Appl. No.: 18/830,007

(22) Filed: Sep. 10, 2024

(51) Int. Cl.
| | |
|---|---|
| *C10L 1/02* | (2006.01) |
| *B01J 27/20* | (2006.01) |
| *B01J 37/04* | (2006.01) |
| *B01J 37/06* | (2006.01) |
| *B01J 37/08* | (2006.01) |

(52) U.S. Cl.
CPC ............... *C10L 1/02* (2013.01); *B01J 27/20* (2013.01); *B01J 37/04* (2013.01); *B01J 37/06* (2013.01); *B01J 37/084* (2013.01); *C10L 2200/0476* (2013.01); *C10L 2270/026* (2013.01)

(58) Field of Classification Search
CPC ... B01J 27/20; B01J 37/04; B01J 37/06; B01J 37/084; C10L 1/02; C10L 2200/0476; C10L 2270/026
See application file for complete search history.

(56) References Cited

U.S. PATENT DOCUMENTS

2015/0065762 A1    3/2015 Agblevor et al.

FOREIGN PATENT DOCUMENTS

IN    1101MUM2006    7/2008

OTHER PUBLICATIONS

Alvarez Serafini, M. S., and G. M. Tonetto. "Production of fatty acid methyl esters from an olive oil industry waste." Brazilian Journal of Chemical Engineering 36.1 (2019): 285-297.

(Continued)

*Primary Examiner* — Brian A McCaig
(74) *Attorney, Agent, or Firm* — Nath, Goldberg & Meyer; Joshua B. Goldberg (57) ABSTRACT

A method of producing biodiesel using waste olive oil can include collecting an olive pulp; extracting olive oil from the olive oil pulp by soaking the olive oil pulp in a solvent to obtain an oil-solvent mixture; removing the solvent from the mixture through evaporation to provide olive oil and a residue pulp; separating the olive oil from the residue pulp; rinsing the residue pulp with deionized water; drying the residue pulp; sieving the dried residue pulp to obtain pulp particles; pyrolyzing the pulp particles to create a carbon powder; adding sulfuric acid to the carbon powder to obtain a mixture; stirring the mixture to obtain a solid; washing the solid with water until a pH of an effluent is neutral; drying the solid; obtaining a sulfonated olive carbon (SOC) catalyst; and using the sulfonated olive carbon (SOC) catalyst for transesterifying waste olive oil to biodiesel.

17 Claims, 8 Drawing Sheets

(56) References Cited

OTHER PUBLICATIONS

Dawodu, Folasegun A., et al. "Effective conversion of non-edible oil with high free fatty acid into biodiesel by sulphonated carbon catalyst." Applied energy 114 (2014): 819-826.

Hernández, Diógenes, et al. "Biodiesel production from an industrial residue: Alperujo." Industrial Crops and Products 52 (2014): 495-498.

Elnasr, Tarek A. Seaf, et al. "Sustainable biodiesel production from waste olive oil: Utilizing olive pulp-derived catalysts for environmental and economic benefits." Sustainable Chemistry and Pharmacy 37 (2024): 101426.

Fadhil, Abdelrahman B., Akram M. Aziz, and Marwa H. Al-Tamer. "Biodiesel production from Silybum marianum L. seed oil with high FFA content using sulfonated carbon catalyst for esterification and base catalyst for transesterification." Energy Conversion and Management 108 (2016): 255-265.

Morillo Pérez, José Antonio. "Biorremediación del alpeorujo: estudio de la microbiota asociada y producción del exopolisacárido jamilano." (2007).

Tsoutsos, T., I. Sarantopoulos, and N. Ouachab. "Sustainable Biodiesel Production from Olive and Meat Industry Byproducts." The 19th European Biomass Conference and Exhibition. 2011.

ECO-FRIENDLY BIODIESEL PRODUCTION METHOD USING WASTE OLIVE OIL AND PULP-DERIVED CATALYSTS

BACKGROUND

1. Field

The disclosure of the present patent application relates to a method of producing biodiesel using waste olive oil and olive pulp-derived catalysts.

2. Description of the Related Art

The advancement of the economy and the fast expansion of the global population have led to a rapid growth in energy consumption. This increase in consumption has resulted in a higher level of energy vulnerability, an increasing degradation of the natural environment, and the emergence of significant climate-related issues. Biodiesel, recognized as a biodegradable, renewable, and ecofriendly fuel, is emerging as a promising substitute for traditional diesel fuel, offering numerous advantages, such as reduced emissions of greenhouse gases, non-toxicity, biodegradability, superior lubricity, storage, improved air quality and the ability to be produced locally to boost rural economies. The development of biodiesel via transesterification or esterification process from waste oil feedstocks, such as used cooking oil and animal fats, has gained widespread attention to reduce waste and increase energy efficiency.

The Renewable Energy Directive advocates for the utilization of biodiesel as a fuel enhancer. Still, it has not been financially successful because the significant expenses of the raw materials needed for its development, which can account for 60-80% of the total expense. Therefore, exploring alternative sources such as inedible plants, animal fats, used cooking oil, and algal biomass for biodiesel production can help augment or replace traditional diesel. However, the high cost of vegetable oil is not the only issue, as the lack of an efficient and affordable catalyst for biodiesel production also presents a significant challenge.

Olive oil waste, also known as olive pomace or olive cake, is the solid residue generated during the extraction of olive oil from olives. The quantity of olive oil waste generated depends on the extraction method used and can vary from 2 to 30% of the total weight of the olives. Olive oil waste is rich in lipids, mainly in the form of triacylglycerols, which makes it a potential feedstock for biodiesel development. The use of olive oil waste for biodiesel production has several advantages. It provides an alternative service for a waste product that would otherwise be discarded, reducing environmental pollution and disposal costs. Additionally, the use of olive oil waste for biodiesel production reduces the competition for food crops as a feedstock resource for biodiesel development. Several studies have determined utilizing olive oil waste for biodiesel production as a sustainable renewable energy source.

Commonly used catalysts in industrial settings for the biodiesel production include sodium and potassium hydroxide as homogeneous bases, as well as sulfuric or hydrochloric acid as homogeneous acids. However, these catalysts can be replaced by heterogeneous catalysts made from carbon materials, which have been shown to be promising alternatives. Developing new biodiesel production processes that utilize these catalysts is an ongoing effort that could yield significant benefits. Carbon-based heterogeneous bifunctional catalysts that can catalyze both transesterification and esterification of feedstocks, specifically, those with great levels of free fatty acids (FFAs), are particularly interesting. These catalysts exhibit dual functionality and have shown promising results in biodiesel production. In an environmentally friendly setting, carbon-based solid acid (CBAS) catalysts produced from pyrolysis products offer several benefits, such as a great surface area, increased acid site density, improved catalyst performance, and economically feasible affordability.

Thus, a new solution to produce biodiesel and biodiesel catalysts in an economical and environmentally friendly way is desired.

SUMMARY

A method of producing biodiesel using waste olive oil can include collecting olive pulp; extracting olive oil from the olive pulp by soaking the olive pulp in a solvent to obtain an oil-solvent mixture; removing the solvent from the mixture through evaporation to provide olive oil and a residue pulp; separating the olive oil from the residue pulp; rinsing the residue pulp with deionized water; drying the residue pulp to provide a dried residue pulp; sieving the dried residue pulp to obtain olive pulp particles; pyrolyzing the pulp particles to create a carbon powder; adding sulfuric acid to the carbon powder to obtain a mixture; stirring the mixture to provide a solid; washing the solid with water; drying the solid to obtain a sulfonated olive carbon (SOC) catalyst; and using the sulfonated olive carbon (SOC) catalyst for transesterifying waste olive oil to biodiesel.

In an embodiment, the sulfonated olive carbon (SOC) catalyst is used for transesterifying waste olive oil to biodiesel by mixing waste olive oil, methanol, and the SOC catalyst to obtain a reaction mixture; stirring the reaction mixture to obtain a product; filtering the product to separate the catalyst and obtain a filtrate; and separating glycerol from the filtrate to obtain a biodiesel sample.

According to an embodiment, a method of producing a sulfonated catalyst using olive pulp can include collecting an olive pulp extracting olive oil from the olive pulp by soaking the olive pulp in a solvent to obtain an oil-solvent mixture. In various embodiments, the solvent may include n-hexane. In other embodiments, other organic solvents may be used. The method may include removing the solvent from the mixture through evaporation to provide olive oil and a residue pulp; and separating the olive oil from the residue pulp. The solvent may be reused multiple times. The residue pulp may be rinsed with deionized water, drying the washed residue pulp, sieving the dried residue pulp to obtain pulp particles, pyrolyzing the pulp particles to provide a carbon powder, and sulfuric acid may be combined with the carbon powder to obtain a mixture. The mixture may be stirred to obtain a solid. The solid may be washed with water and dried to provide a sulfonated olive carbon SOC catalyst.

The present subject matter also relates to a method of producing a sulfonated catalyst using olive pulp. The method may include collecting olive pulp and waste olive oil and extracting additional olive oil from the olive pulp by soaking the olive pulp in a solvent. The method may also include removing the solvent from the additional olive oil through evaporation and rinsing the olive oil pulp with deionized water. The method may also include drying the olive oil pulp and pushing the olive oil pulp through a sieve to obtain particles having a size of 125 μm. The method may further include pyrolyzing the particles to create a carbon powder and adding sulfuric acid to the carbon powder to obtain a mixture. The mixture may be stirred to obtain a solid. The method may also include washing the solid with water until a pH of an effluent is neutral. The method may include drying the solid and obtaining a sulfonated olive carbon SOC catalyst.

The present subject matter relates to a method of producing biodiesel using the SOC catalyst. The method may include mixing together waste olive oil, methanol, and the SOC catalyst to obtain a reaction mixture. The method may also include stirring the reaction mixture to obtain a product and filtering the product to separate the catalyst and obtain a filtrate. The method may further include separating glycerol from the filtrate using a separating funnel to obtain a biodiesel sample.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of producing biodiesel from waste olive oil. The subject presented herein may demonstrate the viability of waste olive oil and olive pulp-derived catalysts for eco-friendly biodiesel production. This approach may address waste management issues, reduces environmental impact, and lower the carbon footprint. Use of Sulfonated Carbon (SC) as a catalyst, optimized through Response Surface Methodology (RSM), yields an impressive 92% biodiesel. Critical conditions include a 15:1 methanol-to-oil ratio, 60° C. reaction temperature, 5-hour reaction time, and 4% catalyst dose. The quality of the biodiesel produced as described herein was confirmed via rigorous analysis. The method as described herein may offer a sustainable, efficient, and economically attractive alternative to traditional catalysts, contributing to cleaner and greener energy solutions.

The present subject matter relates to the generation of a sulfonated carbon catalyst from pyrolyzed olive pulp. Its effectiveness was evaluated in catalyzing biodiesel synthesis through a simulated esterification process involving triglyceride and methanol. The synthesized catalyst was analyzed using various FTIR, XRD, and FESEM techniques. The Box-Behnken experimental design was utilized to estimate the optimal conditions for producing biodiesel, with the process variables including catalyst loading, temperature, and alcohol-to-oil ratio.

The present subject matter relates to a method of producing biodiesel using waste olive oil. In an embodiment, the method comprises collecting an olive pulp; extracting olive oil from the olive pulp by soaking the olive pulp in a solvent to obtain an oil-solvent mixture; removing the solvent from the mixture through evaporation to provide olive oil and a residue pulp; separating the olive oil from the residue pulp; rinsing the residue pulp with deionized water; drying the residue pulp; sieving the dried residue pulp to obtain pulp particles; pyrolyzing the pulp particles to create a carbon powder; adding sulfuric acid to the carbon powder to obtain a mixture; stirring the mixture to obtain a solid; washing the solid with water until a pH of an effluent is neutral; drying the solid; obtaining a sulfonated olive carbon (SOC) catalyst; and using the sulfonated olive carbon (SOC) catalyst for transesterifying waste olive oil to biodiesel. In an embodiment, the pulp particles may have a size ranging from about 90 μm to about 125 μm.

In an embodiment, the sulfonated olive carbon (SOC) catalyst can be used for transesterifying waste olive oil to biodiesel by mixing together the waste olive oil, methanol, and the SOC catalyst to obtain a reaction mixture; stirring the reaction mixture to obtain a product; filtering the product to separate the catalyst and obtain a filtrate; and separating glycerol from the filtrate to obtain a biodiesel sample.

In an embodiment, the solvent recovered through evaporation can be reused multiple times, or indefinitely. However, during the extraction process, some solvent may be lost through evaporation and recondensation. To maintain the total volume, it may be necessary to periodically add fresh solvent to compensate for these losses.

The present subject matter relates to a method of producing a sulfonated catalyst using olive pulp. The method may include collecting an olive pulp extracting olive oil from the olive pulp by soaking the olive pulp in a solvent to obtain an oil-solvent mixture. In various embodiments, the solvent may include n-hexane. In other embodiments, other organic solvents may be used. The method may include removing the solvent from the mixture through evaporation to provide olive oil and a residue pulp; and separating the olive oil from the residue pulp. The solvent may be reused multiple times. The method may further include rinsing the residue pulp with deionized water. The residue pulp may be washed multiple times to remove remaining solvent. The method may also include drying the residue pulp, sieving the dried residue pulp to obtain pulp particles. By non-limiting example, the pulp particles obtained may have a size ranging from about 90 μm to about 125 μm. The pulp particles may be pyrolyzed to provide a carbon powder and sulfuric acid may be combined with the carbon powder to obtain a mixture. The mixture may be stirred to obtain a solid and the solid may be washed with water, preferably until a pH of an effluent is neutral. The washed solid may be dried to provide a sulfonated olive carbon SOC catalyst.

In various embodiments, the particles may be pyrolyzed in a tubular fixed-bed reactor for at least about 1 hour, about 1 hour, or 1 hour at a temperature of at least about 300° C., about 300° C., or 300° C. in a $N_2$ atmosphere. In still other embodiments, a flow of the $N_2$ may be about 20° C./min.

In some embodiments, stirring the mixture may last for at least about 6 hours, about 6 hours, or 6 hours at least about 150° C., about 150° C., or about 150° C. In certain embodiments, the stirring of the mixture can be achieved with a mechanical stirrer. In other embodiments, the stirring of the mixture can be achieved with a magnetic stirrer.

In other embodiments, drying the solid may last for at least about 2 hours, about 2 hours, or 2 hours at a temperature of at least about 100° C., about 100° C., or 100° C.

The method of producing biodiesel using the SOC catalyst may include mixing together waste olive oil, methanol, and the SOC catalyst to obtain a reaction mixture, stirring the reaction mixture to obtain a product, filtering the product to separate the catalyst and obtain a filtrate, and separating glycerol from the filtrate using a separating funnel to obtain a biodiesel sample.

In various embodiments, at least about 1-5 wt %, about 1-5 wt %, or 1-5 wt % of the SOC may be used.

In further embodiments, a ratio of the waste olive oil and the methanol ranges from about 3:1 to about 18:1.

In some embodiments, stirring the reaction lasts for at least about 1 hour to about 6 hours at about 500 rpm.

In another embodiment, stirring the reaction may occur at a temperature of at least about 40° C. to at least about 70° C., about 40° C. to about 70° C., or 40° C. to 70° C.

Using the SOC catalyst in biodiesel production presents promising economic and practical benefits for large-scale operations due to its inherent properties and sustainable sourcing from olive pulp, a byproduct of olive oil production. This may offer a significant cost advantage over traditional catalysts like sodium hydroxide or potassium hydroxide, thanks to the abundance and affordability of olive pulp, readily available from olive oil processing facilities. In addition to its stability and reusability, the SOC catalyst may reduce the need for frequent replacement, leading to substantial cost savings. Repurposing the residue pulp as the catalyst precursor may address waste management challenges and align with circular economy principles and sustainable practices. The bibliometric mapping of biodiesel research has identified crucial gaps, emphasizing the need for more research on sustainability, including environmental impacts, renewable energy sources, and life cycle assessments.

The following examples illustrate the present teachings.

Example 1

Olive Oil Composition

The approximate rough composition of Olive Pulp consists of water (60-70%), lignin (13-15%), cellulose and hemicellulose (18-20%), mineral particles (2.5%), and olive oil retained in the pulp (2.5-3%). The lipid fraction is especially rich in oleic acid (approximately 75%), followed by palmitic, linoleic, and stearic acids. The primary organic constituents in Olive Pulp are sugars (3%), proteins (1.5%), polyphenols (0.2%), volatile fatty acids (C2-C7) (1%), polyalcohols (0.2%), and pigments (0.5%).

Example 2

Olive Oil Extraction from Olive Pomace Residues

Extracting olive oil from pulp involved soaking it in n-hexane overnight, followed by filtration through a Buchner funnel to obtain an oil-solvent mixture. For every 750 g of olive pulp processed, approximately 1 L of n-hexane was used. In this experiment, the n-hexane was recycled by separating it from the extracted oil using a rotary evaporator and then reused in subsequent extraction experiments. The solvent was removed from the mixture utilizing a rotary evaporator at a temperature of 60° C. The recovered solvent was reused multiple times to remove the maximum olive oil possible. ASTM standard test methods were employed to characterize the olive oils, aiming to utilize them as feedstocks in biodiesel production, as presented in Table 1.

TABLE 1

Example 3
FTIR analysis

| Test | WOO | Standard Method |
|---|---|---|
| Acid Value (mg KOH/g) | 1.7 | ASTM D-974 |
| Saponification value (mg KOH/g) | 177 | ASTM D94 |
| Density (g/cm3) | 0.8994 | ASTM D792 |
| Kinematic viscosity, eSt | 89 | ASTM D-445 |
| Oxidative Stability index (h) | 18 | AOCS Cd12b-92 |
| Iodine value (g 12/100 g) | 88 | ASTM D-5554 |

Physico-chemical properties of waste olive oil (WOO).

Figure 1A:
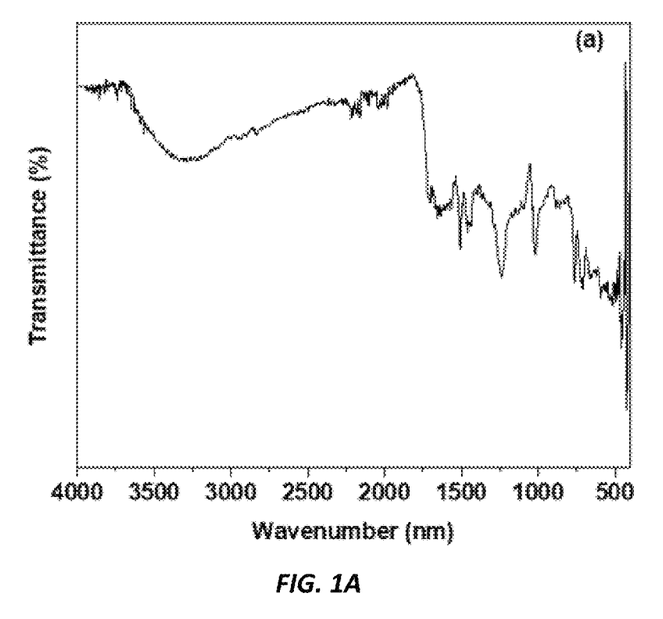
FIG. 1A shows the FTIR spectrum of olive pulp.
Figure 1B:
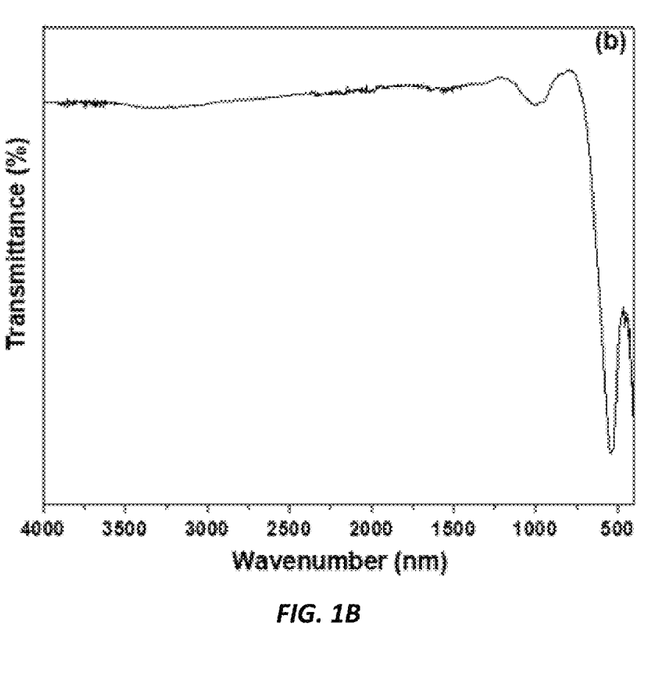
FIG. 1B shows the FTIR spectrum of olive carbon.
Figure 1C:
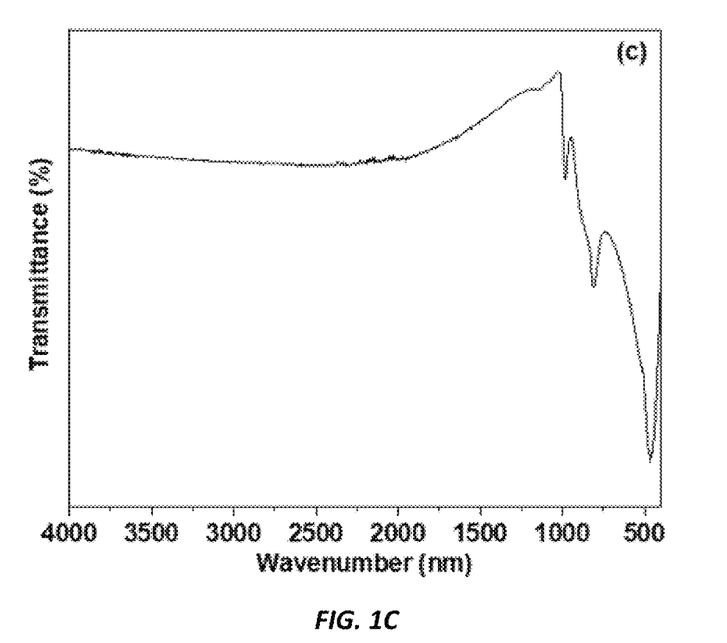
FIG. 1C shows the FTIR spectrum of sulfonated olive carbon.

FIG. 1 illustrates the FTIR spectroscopy of olive pulp (a), activated carbon post-pyrolysis (b), and its sulfonated carbon (c). Firstly, the olive residue exhibited a prominent band in the 3200 cm$^{-1}$ range, assigned to the OH stretching vibration. This band is associated with OH vibrations in compounds such as carboxylic groups, alcohols, and phenols. Many distinctive peaks within the 1200-1700 cm$^{-1}$ range were identified, exclusively linked to organic constituents, including hemicelluloses, lignin, and cellulose. These findings underscore the intricate structure of the samples. Moving to the 1710-1742 cm$^{-1}$ region, C—O stretching was observed in carbonyl of carboxylic moieties and esters. Variations in both wave number (ranging from 1710 to 1742 cm$^{-1}$) and intensity were noted among the three samples. Broad peaks at 1600 cm$^{-1}$ can be attributed to C—C stretching in aromatic compounds and alkenes, with contributions from C—O stretching in ketones. Upon subjecting the olive residue to pyrolysis, distinct bands observed in other parts of the spectra were notably absent. This absence is due to the substantial carbonization of the structure, as proved by the FT-IR spectrum of the carbon sample obtained following pyrolysis at 300° C. under N$_2$ gas. Furthermore, the sulfonated group on the surface of the olive carbon residue, post-sulfonation, exhibited a robust absorption peak at approximately 1130 and 1190 cm$^{-1}$ (indicating asymmetric stretching mode of O=S=O) and 680 cm$^{-1}$ (indicating stretching vibration of C—S). These findings strongly support the existence of —SO$_3$H moieties on the SOC catalyst's surface, indicative of a higher sulfonic acid functional group loading in the O—C—SO$_3$H.

Example 4

XRD Assessment

Figure 2A:
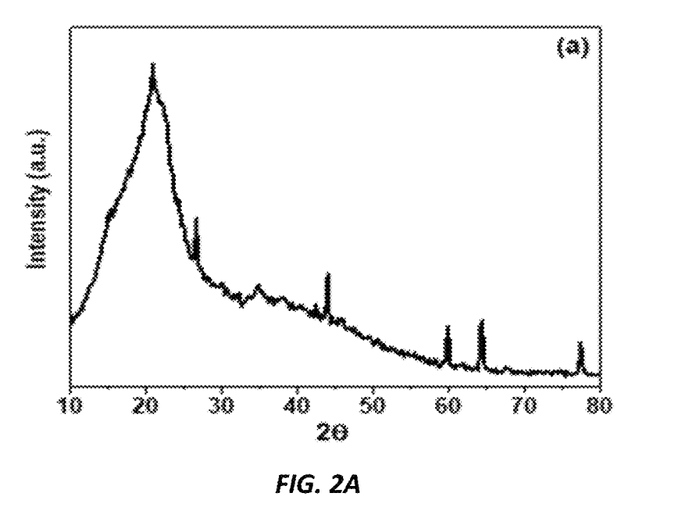
FIGS. 2A, 2B, and 2C shows XRD patterns of olive pulp (2A), olive carbon (2B), and sulfonated olive carbon (2C).
Figure 2B:
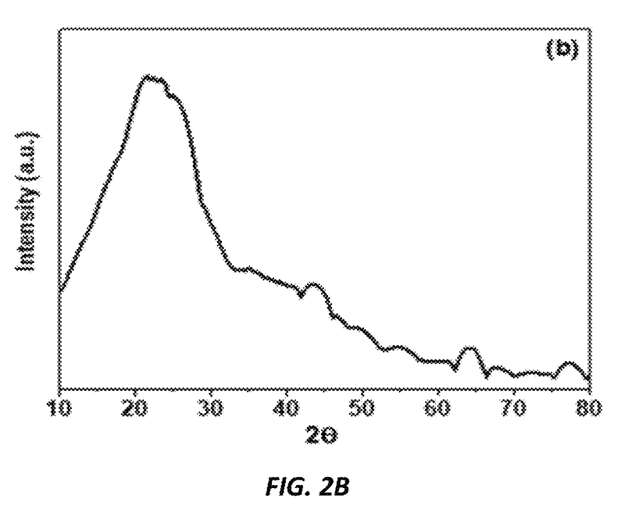
Figure 2C:
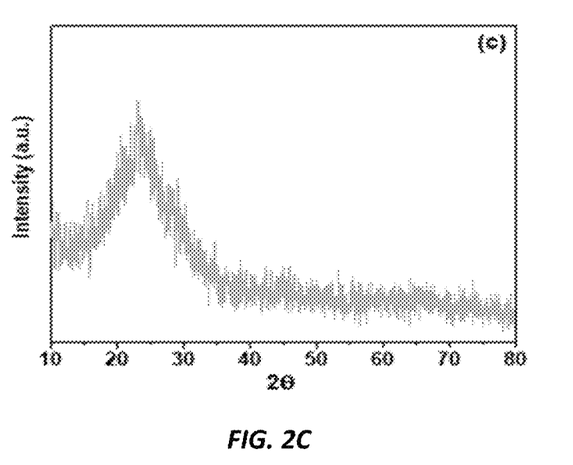

The crystal structures of olive pulp (A), olive carbon residue (B), and sulfonated olive carbon (C) are depicted in FIGS. 2A, 2B, and 2C. Upon close examination of these figures, it becomes evident that there are wide diffraction peaks located within the range of 2θ=10°–30° for all samples. These peaks can confidently correspond to the planes of the carbon material. This particular peak signifies the presence of randomly organized amorphous carbon structures, which exhibit a low degree of crystalline graphite content. This observation strongly suggests that sulfonated carbons (FIG. 2C) have transformed into amorphous carbon materials. This transformation is noteworthy as it implies a shift in the structural characteristics of sulfonated carbon, moving away from crystalline properties towards a more disordered and amorphous arrangement. This change in structure can have significant implications for the material's properties and potential applications.

Example 5

Production of an Acid Catalyst-Derived Carbon Solid from Olive Seed Waste Residue After extracting olive oil from its residue, the residue was rinsed with deionized water several times, dried at 105° C. for 24 hours, crushed, and sieved to particle sizes of 125 μm. The yield was pyrolyzed in a tubular fixed-bed reactor for 1 hour at 300° C. in an N$_2$ atmosphere (20° C./min N$_2$ flow) to create carbon powder. Carbon powder and concentrated sulfuric acid H$_2$SO$_4$ (98%) (20:1) were mixed for 6 hours at 150° C. in a round flask equipped with a magnetic stirrer, a thermometer, and a refluxing condenser. The mixture was then washed several times with distilled water until the pH of the effluent was neutral. It should be noted, however, that in washing the catalyst after sulfonation with H$_2$SO$_4$, the pH does not need to be exactly 7. It can be slightly higher or slightly lower, as long as the washing ensures the removal of excess acid, and the catalyst is neutralized to prevent any residual acidity that could affect subsequent reactions. However, aiming for a pH close to neutral (around 6.5 to 7.5) is generally recommended. Finally, the solid was oven-dried for 2 hours at 100° C. Instead of sulfuric acid, a sulfonated olive carbon SOC catalyst was used as an acid catalyst in transesterifying of waste olive and Waste Cooking Oil (WCO) oils to biodiesel.

Example 6

Characterization of SOC Catalyst

The surface morphology of the sulfonated olive carbon (SOC) catalyst was characterized utilizing a scanning electron microscope (SEM) (Thermo Fisher), with the carbon and sulfonated samples being dried overnight at 70° C., mounted on a SEM stub, and coated with a thin layer of gold under vacuum before examination at 20 kV. Fourier transform infrared spectroscopy (ATR-FTIR) was employed to explore the functional moieties present in the SOC, with the sample being dehumidified by drying overnight at 70° C. before being placed on a sample holder for spectral scanning 30 times at wavelengths between 400 and 4000 cm$^{-1}$. X-ray diffraction (XRD) patterns were obtained utilizing a PANanalytical approach (XRD Optima 7000 Shimadzu) to identify changes in the existing crystal phases and lattice properties of the sulfonated carbon catalyst.

Example 7

Morphological Characteristics

Figure 3A:
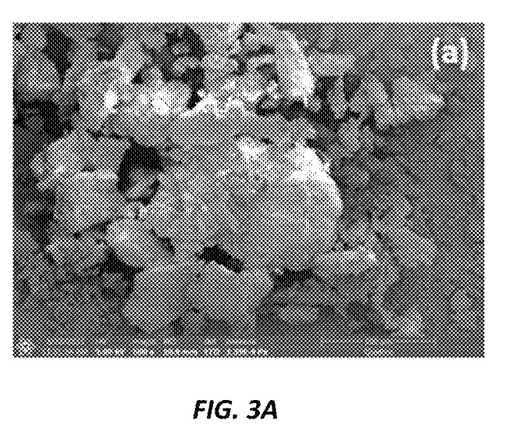
FIGS. 3A, 3B, and 3C shows FESEM images of olive pulp (3A), olive carbon (3B) and sulfonated olive carbon (3C).
Figure 3B:
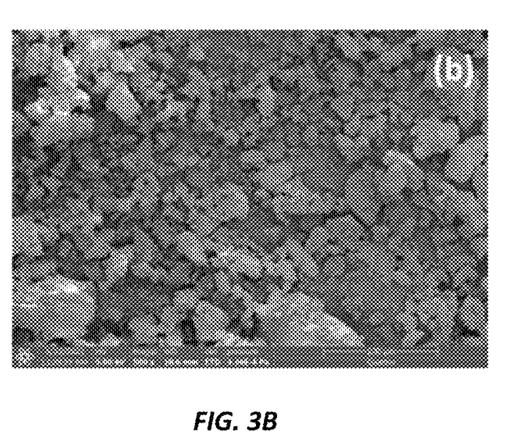
Figure 3C:
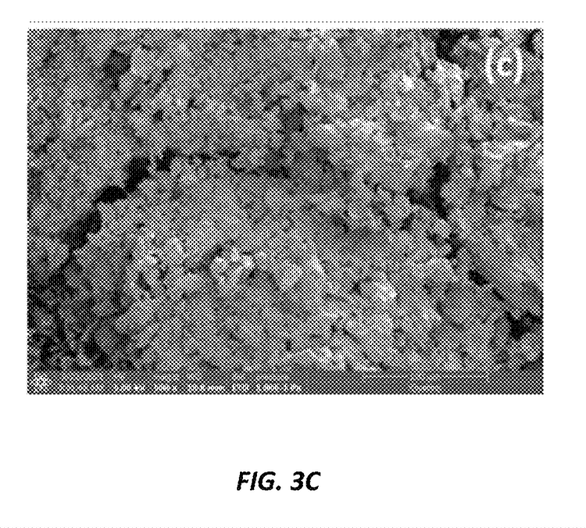

In FIGS. 3A, 3B, and 3C, the morphology of carbon derived from olive waste and its sulfonated counterpart can be observed. The carbonized olive residue exhibited a loosely arranged, irregular network structure characterized by particle accumulation and numerous micrometer sized pores (FIG. 3B). Additionally, microspores were detected within the carbon matrix. Upon sulfonation with concentrated $H_2SO_4$, notable changes in the material's structure occurred (FIG. 3C). The agglomerated particles underwent partial fragmentation, and the pores expanded in size. This transformation suggests that the resulting carbon material catalyst possessed an abundance of external acid sites available for interacting with reactants. This morphological evolution is significant as it indicates an enhanced catalytic potential resulting from the sulfonation process, which could have important implications for its practical applications. In summary, the combination of FTIR spectroscopy, XRD assessment, and morphological analysis provides a comprehensive understanding of the structural and functional features of the catalyst. These characteristics are instrumental in elucidating the catalyst's performance and suitability for biodiesel production.

Example 8

Biodiesel Production

Waste olive oil (WOO) was used as a biodiesel development material. The process involved heating a blend of WOO, methanol, and a heterogeneous acid catalyst sulfonated olive carbon (SOC) in a round flask. The amount of SOC catalyst in the reaction was 3-5% by weight. The methanol was used at a mole ratio of 15-18:1 relative to the oil. Stirring at 500 rpm was maintained during the desired temperature and time range (40-70° C., 1-6.0 hours). Various reaction factors were studied, including catalyst weight percentage (1-5%), reaction time, methanol to oil molar ratio (3:1 to 18:1), and temperature. After each test, the product was filtered to separate the used catalyst. The filtrate was subsequently subjected to separation using a separating funnel to eliminate glycerol and obtain the resulting biodiesel sample. For acid catalysts, the above layer was rinsed with hot deionized water until a neutral pH was obtained. Alternatively, the blend was centrifuged at 5000 rpm for 15 minutes for the SOC catalyst to separate it. To further refine the biodiesel, residual methanol, and water were eliminated using a rotary evaporator at 70° C. The conversion value was estimated based on the percentage of biodiesel obtained using equations (1) and (2).

$$\text{Biodiesel yield (\%)} = ((\text{Weightofbiodieselx \% FAME})/\text{Weightofoil})) \times 100 \quad (1)$$

$$\text{Biodiesel yield (\%)} = 1-((\text{viscosityofbiodiesel})/\text{viscosityoffusedoil}) \times 100 \quad (2)$$

The fatty acid methyl ester (FAME) yield was estimated by gas chromatography (Gas Chromatography (GC-MS; Agilent). The capillary column was DB-WAX (30.0 m length, 0.25 mm internal diameter, and 0.25 mm film thickness). The FAMEs for produced biodiesel were estimated by calculating of peak area for each FAME known by molecular weight (Table 2).

TABLE 2

| n | Fatty Acid Methyl ester | C | M wt. | WOO, % |
|---|---|---|---|---|
| 1 | Methyl Laurate | C12:0 | 214 | 0.072 |
| 2 | Methyl Myristate | C14:0 | 242 | 0.075 |
| 3 | Methyl Myristoleate (cis-9) | C14:1 | 240 | 1.571 |
| 4 | Methyl Palmitate | C16:0 | 270 | 23.58 |
| 5 | Methyl Palmitoleate (cis-9) | C16:1 | 268 | 0.0993 |
| 6 | Methyl Stearate | C18:0 | 298 | 11.885 |
| 7 | Methyl Oleate (cis-9) | C18:1 | 296 | 51.368 |
| 8 | Methyl Linoleate (cis-9, 12) | C18:2 | 294 | 9.5216 |
| 9 | Methyl Linolenate (cis-9, 12, 15) | C18:3 | 292 | 0.0685 |
| 10 | Methyl Arachidate | C20:0 | 326 | 1.1811 |
| 11 | Methyl Eicosenoate (cis-11) | C20:1 | 324 | 0.0685 |
| 12 | Methyl Behenate | C22:0 | 354 | 0.6313 |

Fatty acid profile for WOOME.

The method employed for the development of biodiesel utilizing waste olive oil and a catalyst stemming from olive pulp offers significant advantages both from an environmental and economic standpoint. Firstly, it addresses the pressing issue of olive waste management by repurposing discarded olive oil and pulp, thereby reducing environmental pollution and landfill usage. This sustainable approach contributes to conserving natural resources and lowers the carbon footprint associated with waste disposal. Moreover, utilizing olive pulp-derived catalysts adds an economic dimension to this biodiesel production method. Traditional catalysts can be expensive and have environmental implications during their production. In contrast, using olive pulp-derived catalysts provides a cost-effective alternative and reduces the demand for conventional catalysts, making biodiesel production more economically viable.

Furthermore, the method described herein achieved an impressive biodiesel yield of over 94%. This could be attributed to (i) the fruitful introduction of sulfonic acid functional moieties (—$SO_3H$) on the catalyst's surface during the sulfonation process as the presence of these functional groups enhances the acidity of the catalyst, facilitating stronger interactions with reactants and promoting efficient transesterification reactions; (ii) the amorphous structure contributes to a higher surface area and more extensive accessibility of active centers, promoting boosted catalytic activity during the biodiesel production process; (iii) the expanded pores and altered morphology contribute to a higher availability of external acid sites on the catalyst's surface, facilitating improved contact between reactants and catalytic sites. This innovative biodiesel production method may not only aid in eliminating olive waste but also offers an economically efficient and eco-friendly solution, aligning with sustainable and green energy production principles.

Figure 4:
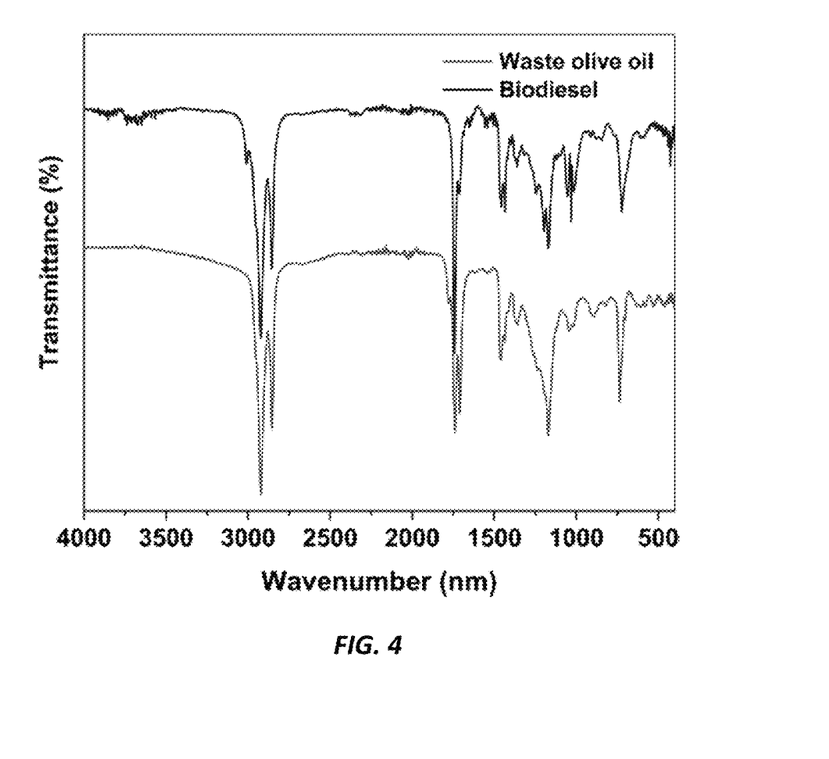
FIG. 4 shows FT-IR spectra of waste olive oil (WOO) (bottom) and produced biodiesel (top).

The confirmation of the chemical structure of biodiesel involved several techniques, including FT-IR, $^1$HNMR, and $^{13}$CNMR. FIG. 4 illustrates the functional groups formed in fatty acid methyl esters for WOO and their disappearance in triglycerides. Monitoring the transesterification processes of WOO was achieved through FTIR spectroscopic analysis. The FTIR spectrum of WOOME reveal a distinctive band in the range of 1425-1447 cm$^{-1}$ for O—$CH_3$ asymmetric bending and 1188-1200 cm$^{-1}$ for O—$CH_3$ stretching, providing clear evidence of the conversion of oils into biodiesel. Notably, these IR bands were absent in the IR spectra of WOO, IR bands in the 1370-1400 cm$^{-1}$ range, corresponding to O—$CH_2$ moieties in glycerol (a component of monoglycerides, diglycerides, and triglycerides), were exclusively observed in the FTIR spectra of WOO, corroborating these findings.

Figure 5A:
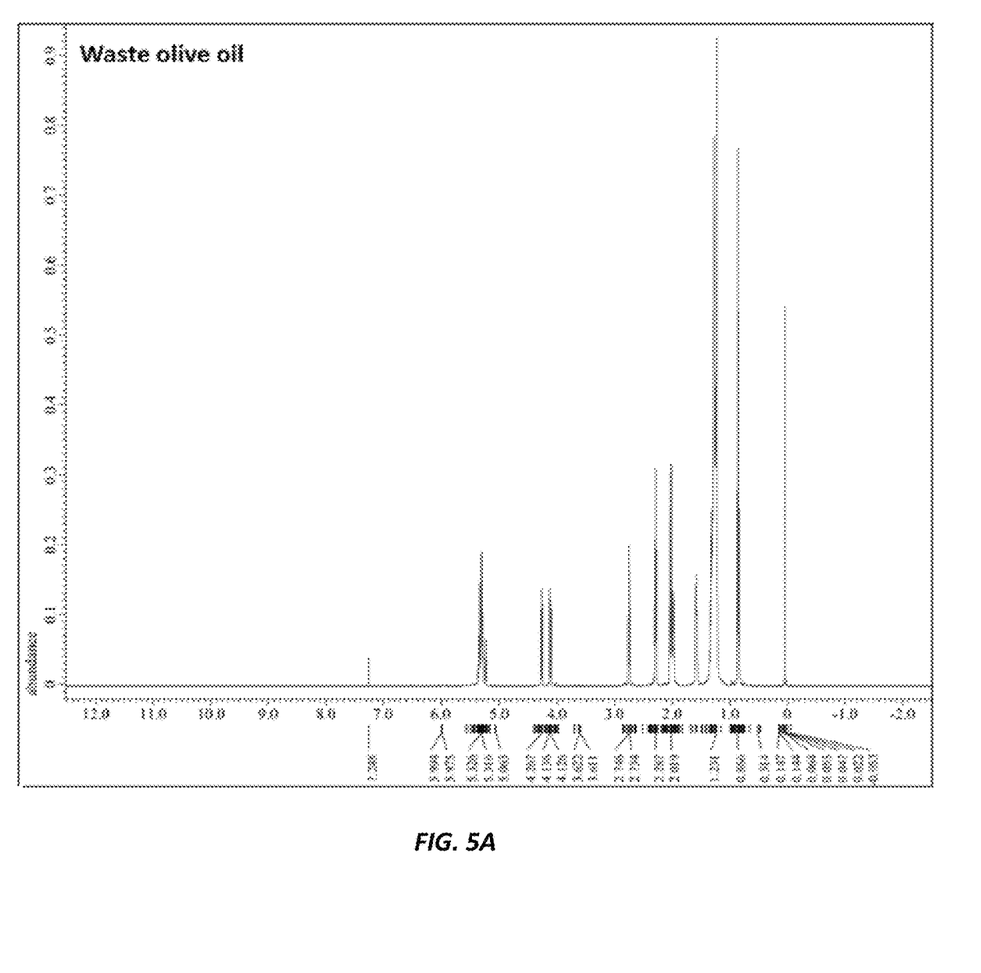
FIGS. 5A and 5B shows $^1$HNMR of waste olive oil (WOO) (5A) and produced biodiesel (5B).
Figure 5B:
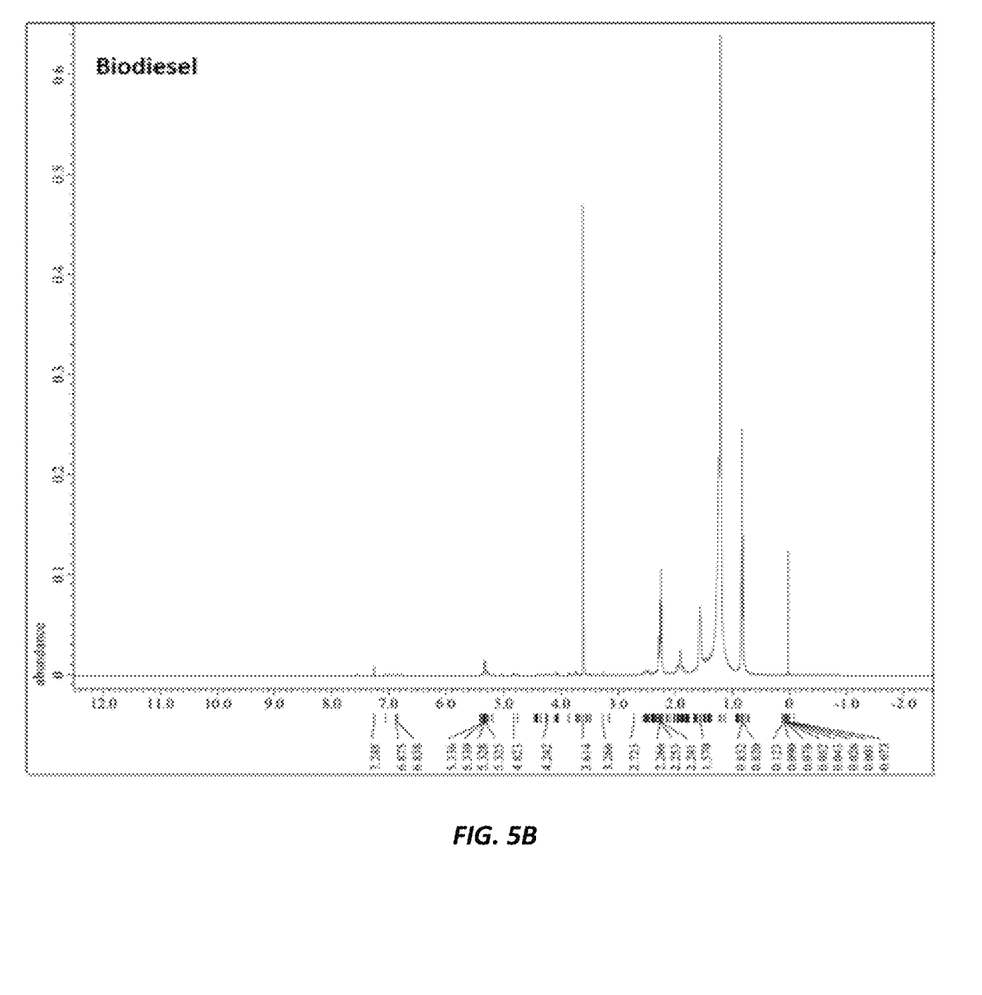

To evaluate biodiesel samples, $^1$HNMR spectroscopy was employed, and the spectra are presented in FIGS. 5A and 5B. In WOOME, the singlet peak at approximately 3.65 ppm corresponds to methoxy protons (—O—CH$_3$) and indicates the existence of methyl esters, while other bands in the 0.87-0.90 ppm range are attributed to terminal methyl (—CH$_3$) proton. Further chemical changes are evident, including peaks at 1.88-1.96 ppm for protons adjacent to methylene carbonyl groups (—CH$_2$—C=O—), bands at 2.57-2.69 ppm for diallylic methylene protons (—C=C—CH$_2$—C=C—), and a peak at 4.17 ppm for protons within glyceryl functional groups, all identified in the WOOME sample. Peaks observed at about 130 and 125 ppm signify the presence of unsaturation in methyl esters. Meanwhile, signals at 14 ppm are associated with the terminal carbon of methyl groups (—CH$_3$), and signals within the 10-35 ppm range are attributed to methylene carbons (—CH$_2$—) within the extended carbon chain of fatty acid methyl esters (FAMEs).

Example 8

Reusability of SOC Catalyst

Figure 6:
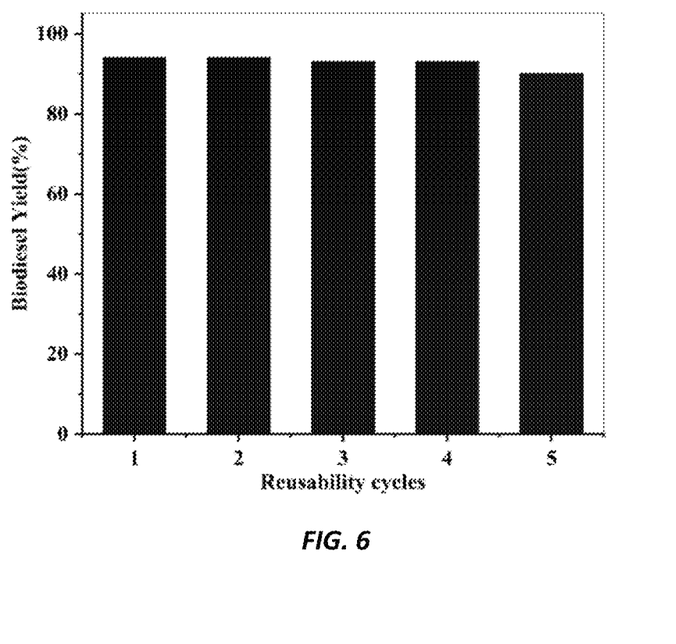
FIG. 6 shows a graph illustrating the reusability of the sulfonated olive carbon catalyst for production of biodiesel.

The selection of sulfonated olive carbon for reusability testing was a deliberate decision driven by its remarkable catalytic performance among the prepared catalysts. This catalyst exhibited unparalleled activity, achieving an impressive 94% biodiesel yield. Given its outstanding efficacy and potential for sustained catalytic activity over multiple cycles, sulfonated olive carbon emerged as the ideal candidate for in-depth reusability examination. The reusability assessment involved subjecting sulfonated olive carbon to five successive runs in the biodiesel production while maintaining consistent reaction conditions (FIG. 6). The catalyst demonstrated a capacity for recycling without compromising its catalytic potency. Throughout the investigative cycles, sulfonated olive carbon exhibited robust stability, showcasing only a modest 4% reduction in activity after the fifth run. This slight decline in performance can be attributed to the minimal quantity of catalyst utilized during the reusability measurement.

It is to be understood that the method of producing biodiesel from waste olive oil described herein is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of producing biodiesel using waste olive oil, the method comprising:
   collecting olive pulp;
   extracting olive oil from the olive pulp by soaking the olive pulp in a solvent to obtain an oil-solvent mixture;
   removing the solvent from the oil-solvent mixture through evaporation to provide olive oil and a residue pulp;
   separating the olive oil from the residue pulp;
   rinsing the residue pulp with deionized water;
   drying the residue pulp to provide a dried residue pulp;
   sieving the dried residue pulp to obtain pulp particles;
   pyrolyzing the pulp particles to create a carbon powder;
   adding sulfuric acid to the carbon powder to obtain a mixture;
   stirring the mixture to provide a solid;
   washing the solid with water;
   drying the solid to obtain a sulfonated olive carbon (SOC) catalyst; and
   transesterifying the waste olive oil to biodiesel by:
   mixing the waste olive oil, methanol, and the SOC catalyst to obtain a reaction mixture;
   stirring the reaction mixture to obtain a product;
   filtering the product to separate the SOC catalyst and obtain a filtrate; and
   separating glycerol from the filtrate to obtain the biodiesel.

2. The method of claim 1, further comprising refining the biodiesel by eliminating methanol and water using a rotary evaporator.

3. The method of claim 1, wherein the solvent is n-hexane.

4. The method of claim 1, wherein the pulp particles are pyrolyzed in a tubular fixed-bed reactor for at least about 1 hour at about 300° C. in a N$_2$ atmosphere.

5. The method of claim 4, wherein a flow of the N$_2$ is sufficient to increase the temperature by about 20° C. per minute.

6. The method of claim 1, wherein stirring the mixture lasts for at least about 6 hours at about 150° C. with a mechanical stirrer.

7. The method of claim 1, wherein the solid is dried for at least about 2 hours at about 100° C.

8. The method of claim 1, wherein at least about 1-5 wt % of the SOC catalyst is used in the transesterifying step.

9. The method of claim 1, wherein at least about 3-5 wt % of the SOC catalyst is used in the transesterifying step.

10. The method of claim 9, wherein a molar ratio of the waste olive oil and the methanol ranges from about 3:1 to about 18:1.

11. The method of claim 1, wherein a molar ratio of the waste olive oil and the methanol is between about 3:1 and about 18:1.

12. The method of claim 1, wherein stirring the reaction mixture lasts for at least about 1 hour to about 6 hours at about 500 rpm.

13. The method of claim 1, wherein stirring the reaction mixture occurs at a temperature ranging from about 40° C. to about 70° C.

14. A method of producing a sulfonated catalyst, comprising:
   collecting an olive pulp;
   extracting olive oil from the olive pulp by soaking the olive pulp in a solvent to obtain an oil-solvent mixture;
   removing the solvent from the oil-solvent mixture through evaporation to provide olive oil and a residue pulp;
   separating the olive oil from the residue pulp;
   rinsing the residue pulp with deionized water;
   drying the residue pulp;
   sieving the dried residue pulp to obtain pulp particles;
   pyrolyzing the pulp particles to create a carbon powder;
   adding sulfuric acid to the carbon powder to obtain a mixture;
   stirring the mixture to obtain a solid;
   washing the solid with water; and
   drying the washed solid to provide a sulfonated olive carbon (SOC) catalyst.

15. A method of producing biodiesel using the SOC catalyst produced according to claim 14, the method comprising:

mixing together waste olive oil, methanol, and the SOC catalyst to obtain a reaction mixture;

stirring the reaction mixture to obtain a product;

filtering the product to separate the SOC catalyst and obtain a filtrate; and separating glycerol from the filtrate to obtain the biodiesel.

16. The method of claim 14, wherein the solvent is n-hexane.

17. A method of producing biodiesel using waste olive oil, the method comprising:

collecting olive pulp;

extracting olive oil from the olive pulp by soaking the olive pulp in a solvent to obtain an oil-solvent mixture;

removing the solvent from the mixture through evaporation to provide olive oil and a residue pulp;

separating the olive oil from the residue pulp;

rinsing the residue pulp with deionized water;

drying the residue pulp to provide a dried residue pulp;

sieving the dried residue pulp to obtain pulp particles;

pyrolyzing the pulp particles to create a carbon powder;

adding sulfuric acid to the carbon powder to obtain a mixture;

stirring the mixture to provide a solid;

washing the solid with water;

drying the solid to obtain a sulfonated olive carbon (SOC) catalyst; and transesterifying the waste olive oil with the sulfonated olive carbon (SOC) catalyst to obtain the biodiesel.

\* \* \* \* \*